US008641329B2

(12) United States Patent
Barrios

(10) Patent No.: US 8,641,329 B2
(45) Date of Patent: Feb. 4, 2014

(54) PNEUMATIC TRANSPORT ZONE EXCHANGE SYSTEM AND METHOD

(75) Inventor: Pedro Barrios, Elkhorn, WI (US)

(73) Assignee: Swisslog Healthcare Solutions, Denver, CO (US)

( * ) Notice: Subject to any disclaimer, the term of this patent is extended or adjusted under 35 U.S.C. 154(b) by 509 days.

(21) Appl. No.: 13/026,530

(22) Filed: Feb. 14, 2011

(65) Prior Publication Data

US 2012/0051848 A1 Mar. 1, 2012

Related U.S. Application Data

(60) Provisional application No. 61/376,817, filed on Aug. 25, 2010.

(51) Int. Cl.
*B65G 51/24* (2006.01)

(52) U.S. Cl.
USPC .......................................... 406/182; 137/875

(58) Field of Classification Search
USPC ........................................... 406/182; 137/875
See application file for complete search history.

(56) References Cited

U.S. PATENT DOCUMENTS

| | | | |
|---|---|---|---|
| 2,679,990 A | 6/1954 | Mathzeit et al. | |
| 2,710,728 A | 6/1955 | Halpern | |
| 2,893,660 A | 7/1959 | Cook et al. | |
| 3,236,475 A | 2/1966 | Mach et al. | |
| 3,536,098 A * | 10/1970 | Cunningham | 406/182 |
| 3,627,231 A | 12/1971 | Kalthoff | |
| 3,817,476 A | 6/1974 | Martin | |
| 3,829,042 A * | 8/1974 | Torochkov et al. | 406/182 |
| 3,951,461 A | 4/1976 | De Feudis | |
| 4,058,274 A | 11/1977 | Hochradel et al. | |
| 4,063,572 A * | 12/1977 | Anderegg et al. | 137/862 |
| 4,223,700 A * | 9/1980 | Jones | 137/874 |
| 4,354,775 A | 10/1982 | Jalas | |
| 4,516,888 A * | 5/1985 | Kardinal | 406/182 |
| 4,529,335 A * | 7/1985 | Hilbert et al. | 406/1 |
| 4,563,112 A | 1/1986 | Mokuya et al. | |
| 4,630,216 A | 12/1986 | Tyler et al. | |
| 4,766,547 A | 8/1988 | Modery et al. | |
| 5,038,290 A | 8/1991 | Minami | |
| 5,165,826 A | 11/1992 | Egbert | |
| 5,217,328 A | 6/1993 | Lang | |
| 5,234,292 A | 8/1993 | Lang | |
| 5,237,931 A | 8/1993 | Riedl | |
| 5,267,173 A | 11/1993 | Tanizawa et al. | |
| 5,375,691 A | 12/1994 | Wirtz | |
| 5,562,367 A | 10/1996 | Scott | |
| 5,682,820 A | 11/1997 | Arata | |
| 5,805,454 A | 9/1998 | Valerino, Sr. et al. | |
| 5,864,485 A | 1/1999 | Hawthorne et al. | |
| 5,896,297 A | 4/1999 | Valerino, Sr. | |
| 6,048,086 A | 4/2000 | Valerino, Sr. | |
| 6,074,136 A * | 6/2000 | Steele | 406/182 |
| 6,173,212 B1 | 1/2001 | Valerino, Sr. | |

(Continued)

*Primary Examiner* — Joseph Dillon, Jr.
(74) *Attorney, Agent, or Firm* — Russell T. Manning; Marsh Fischmann & Breyfogle LLP

(57) ABSTRACT

Provided herein is a system and method for providing inter-zone connections between first and second portions of a pneumatic tube system. The systems and methods (i.e., utilities) permit creating a direct pneumatic path between the first zone and the second zone. In this regard, air pressure or vacuum from a first zone may be utilized to effectuate transfer of a carrier through a portion or all of the second zone and/or to provide operating pressure or vacuum to the second zone.

13 Claims, 11 Drawing Sheets

(56) References Cited

U.S. PATENT DOCUMENTS

| | | |
|---|---|---|
| 6,202,004 B1 | 3/2001 | Valerino, Sr. |
| 6,477,442 B1 | 11/2002 | Valerino, Sr. |
| 6,516,810 B1 * | 2/2003 | Haul .............................. 131/282 |
| 6,712,561 B1 | 3/2004 | Valerino, Sr. et al. |
| 7,243,002 B1 | 7/2007 | Hoganson et al. |
| 7,326,005 B1 | 2/2008 | Castro et al. |
| 7,328,084 B1 | 2/2008 | Hoganson et al. |
| 7,363,106 B1 | 4/2008 | Hoganson et al. |
| 7,424,340 B2 | 9/2008 | Owens |
| 7,751,930 B2 | 7/2010 | Valerino, Sr. |
| 8,001,994 B2 * | 8/2011 | Miller et al. ................... 137/874 |
| 2011/0170962 A1 * | 7/2011 | Watson et al. ................. 406/108 |
| 2011/0240143 A1 * | 10/2011 | Lang et al. ..................... 137/343 |

\* cited by examiner

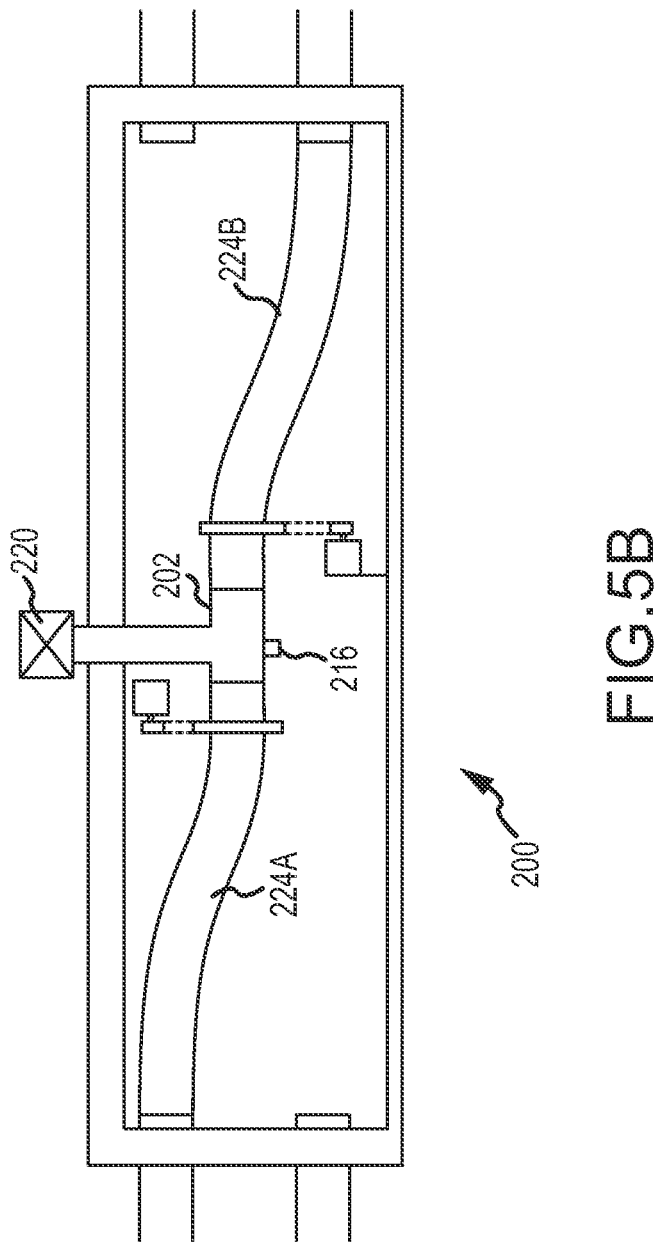

PNEUMATIC TRANSPORT ZONE EXCHANGE SYSTEM AND METHOD

CROSS REFERENCE

This application claims the benefit of the filing date of U.S. Provisional Application No. 61/376,817 entitled: "Pneumatic Transport Zone Exchange System and Method" having a filing date of Aug. 25, 2010, the entire contents of which is incorporated herein by reference.

FIELD

The presented disclosure relates generally to pneumatic tube carrier systems. More specifically, the disclosure provides systems, apparatuses, and methods for exchanging carriers between different pneumatic zones of a pneumatic tube carrier system.

BACKGROUND

Pneumatic tube carrier systems are a well-known means for the automated transport of materials between, for example, an origination location and any one of a plurality of destination locations. A typical system includes a number of pneumatic tubes interconnected in a network to transport carriers between user stations. Various blowers and transfer units provide the force and path control means, respectively, for moving the carriers through and from tube-to-tube within the network. Generally, transfer units move or divert pneumatic carries from a first pneumatic tube to a second pneumatic tube in order to route the pneumatic carrier between locations, or stations, in the network.

The pneumatic tubes forming the network of a pneumatic tube system may be arranged in any manner that allows the carriers to be transferred between various stations. Generally, systems include a number of individual stations interconnected to the network by a single pneumatic tube. The single pneumatic tube transfers carriers to and from the station under pressure and vacuum. Other portions of the network and/or certain stations may utilize dedicated unidirectional pneumatic tubes. It will be appreciated that the number and distances between stations in the network may be quite large. For instance, many large facilities (e.g., hospitals) incorporate pneumatic tube systems having dozens of user stations where the distance between the most distally located pair of stations may exceed several hundred yards or even several miles.

Large pneumatic tube systems often require a complex network of interconnected tubes. Further, to provide functionality to separate portions of such large systems, most such systems are divided into multiple zones. Typically, each zone includes a set of stations that receive pneumatic pressure and/or vacuum from a common blower. For instance, a transfer unit that receives pressure and/or vacuum from the common blower may connect to each station of such a zone. This transfer unit permits carriers received from a tube connected to one of the stations to be transferred to a tube associated with another of the stations. However, effective use of the pneumatic tube system requires connecting the different zones to permit inter-zone traffic (i.e., transfers from zone to zone).

To provide inter-zone connections, zones commonly connect to a specialized zone transfer unit. Such zone transfer units have heretofore required connecting each serviced zone with a dedicated input and output tube and have limited the expansion of the pneumatic system to a number of zones corresponding to the number of sets of inlet and outlet tubes of the zone transfer unit. Such dedicated interconnection, while providing effective inter-zone transport, results in complex tubing arrangements and often requires that a blower of a zone sending a carrier to another zone stand-by to deliver the carrier until a downstream path becomes available. This, of course, prevents the blower from processing other transactions. Stated otherwise, current inter-zone transfer units can result in various system inefficiencies.

SUMMARY

Provided herein is a system and method for improving inter-zone connections between first and second portions of a pneumatic tube system. The systems and methods (i.e., utilities) permit creating a direct pneumatic path between the first zone and the second zone. In this regard, air pressure or vacuum from a first zone may be utilized to effectuate transfer of a carrier through a portion or all of the second zone and/or to provide operating pressure or vacuum to the second zone. The ability to utilize inter-zone pressure may also allow for bidirectional travel through inter-zone connections. In this regard, a single pneumatic tube may interconnect a first and a second zone and thereby reduce the complexity and costs associated with previous pneumatic systems. Further, aspects of the presented utilities facilitate pneumatic tube system expansion.

According to a first aspect, a pneumatic transfer device for transferring pneumatic carriers between a first pneumatic system portion and a second pneumatic system portion is provided. Generally, each portion of the pneumatic system will include an air source (e.g., blower), one or more transfer units and one or more user stations. Likewise, each portion of the system includes multiple pneumatic tubes. The transfer device includes a first diverter having a first head end with a head end port and a first transfer end with a plurality of transfer ports which are connected to a first plurality of pneumatic tubes. The first diverter includes a transfer tube for selectively interconnecting any of the first plurality of pneumatic tubes with the first head end port. The device further includes a second diverter having a second head end with a second head end port and a second transfer end with a plurality of transfer ports connected to a second plurality of the pneumatic tubes. A transfer tube of the second diverter may selectively interconnect any of the second plurality of tubes to the second head end port. Each of the first and second plurality of tubes may connect to a separate system zones, though this is not a requirement. A connecting tube directly interconnects the first and second head end ports. In this regard, a carrier passing through the first head end port may pass through the internal bore of the connecting tube to the second head end port. Finally, the device includes a valve, vent or other pressure release mechanism for venting the connecting tube to atmosphere. In this regard, when the valve/vent is open, the valve/vent may prevent pneumatic connection between the first and second portions of the system. In contrast, when the valve/vent is closed, airflow may pass through the transfer device from the first portion of the system to the second portion of the system in a continuous pneumatic path.

A computer control system generates control signals that allow for aligning the transfer tubes of the diverters with desired ones of the first and second plurality of pneumatic tubes. It will be appreciated, these first and second pneumatic tubes may each lead to separate system zones. However, it will be further appreciated that one or more of the tubes connected to the diverters may lead directly to a user station and/or a temporary storage location.

The diverters may have any appropriate configuration. Typically, these diverters are a multiple to single diverter where multiple transfer ports interconnected to multiple pneumatic tubes are selectively diverted to a single head end port. However, it will be appreciated that in other arrangements, the diverter may include two or more head end ports. In this regard, both ends of the transfer tube may be selectively connectable to two or more ports.

In one arrangement, a sensor associated with the connecting tube allows for identifying passage of a carrier there through. In many instances, once a carrier has passed through the connecting tubes, the delivery and/or receiving diverter may immediately be redirected to align another transaction prior to the carrier reaching its destination. Such functionality typically requires the receiving zone to be applying vacuum.

In another aspect, a transfer device is provided having first and second transfer tubes where each transfer tube has one end rotatably coupled to a pneumatic coupling where the pneumatic coupling has an internal bore sized to permit the transit of a pneumatic carrier there through. Accordingly, a pneumatic carrier may pass from the first transfer tube to the second transfer tube via the pneumatic coupling. The second end of each of the transfer tubes is an offset end that may be rotated relative to any one of a plurality of ports interconnectable to a plurality of individual pneumatic tubes. Accordingly, by selectively rotating the first and second transfer tubes, any one of a first set of pneumatic tubes may be interconnected to any one of a second set of the pneumatic tubes. A valve/vent in communication with the pneumatic coupling allows for selectively venting the pneumatic coupling to atmosphere.

According to another aspect, a method is provided for interconnecting a first zone of pneumatic tube system to a second zone of the pneumatic tube system. Typically, each zone will include a separate air source that provides pneumatic pressure or vacuum to various pneumatic tubes and/or user stations disposed within that zone. The method includes connecting head end ports of first and second diverter units with a connecting tube where each diverter diverts multiple pneumatic tubes to the connecting tube. The method further includes aligning a first transfer tube of the first diverter with a pneumatic tube of a first zone. A second transfer tube of the second diverter is then aligned with a second tube of a second pneumatic zone. An air source of the first or second zone may be operated to provide pressure or vacuum to a least one of the first or second diverters. At this time, a vent or valve disposed within the connecting tube may be closed to communicate the airflow from one zone to another zone. Accordingly, the method allows for creating a continuous pneumatic path between the first and second tubes of the first and second zones and allows for supplying airflow from a first zone to a second zone. Such functionality may allow eliminating temporary carrier holding devices that previously were required to stage inter-zone communications.

BRIEF DESCRIPTION OF THE DRAWINGS

For a more complete understanding of the present disclosure and further advantages thereof, reference is now made to the following detailed description taken in conjunction with the drawings in which:

FIG. 5B illustrates a second embodiment of an inter-zone transfer unit.

DETAILED DESCRIPTION

Reference will now be made to the accompanying drawings, which at least assist in illustrating the various pertinent features of the presented inventions. In this regard, the following description is presented for purposes of illustration and description. Furthermore, the description is not intended to limit the disclosed embodiments of the inventions to the forms disclosed herein. Consequently, variations and modifications commensurate with the following teachings, and skill and knowledge of the relevant art, are within the scope of the presented inventions.

Figure 1:
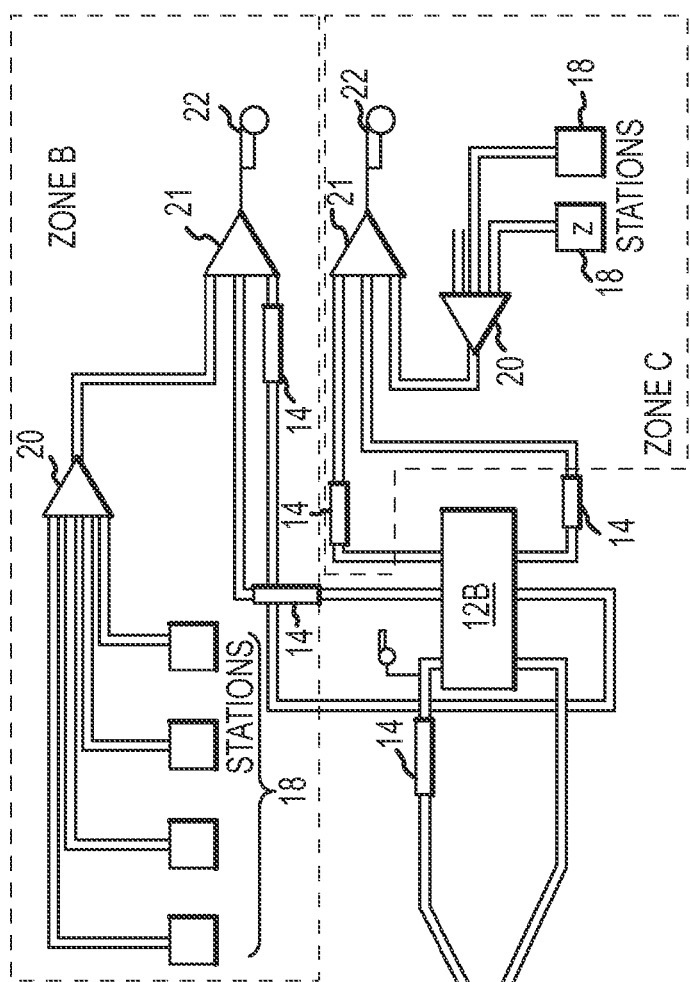
FIG. 1 illustrates one embodiment of a prior art pneumatic tube system.
Figure 1:
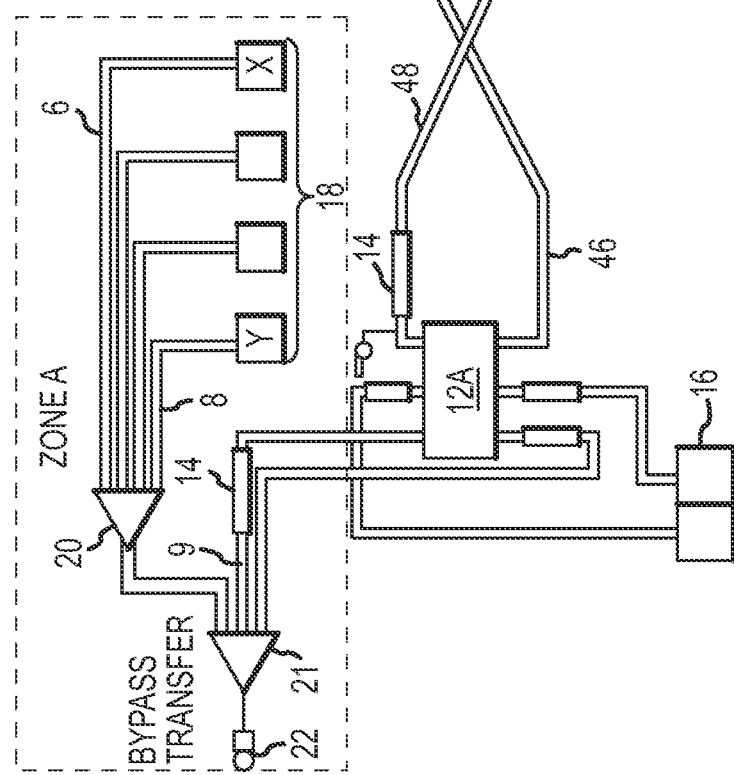

Disclosed in FIG. 1 is a system diagram for a pneumatic carrier system 10. In general, the pneumatic carrier system 10 transports pneumatic carriers between various user stations 16, 18, each such transport operation being referred to herein as a "transaction". At each of the user stations 16, 18, a user may insert a carrier, select/enter a destination address/identification and/or a transaction priority, and then send the carrier. The system determines a path to route the carrier and begins directing the carrier through the system.

Interconnected with each station 18 is a transfer unit 20 which orders carriers arriving through different tubes from a different stations 18 into a single pneumatic tube. This pneumatic tube is further in connection with a vacuum by-pass transfer unit 21 (i.e., turn around transfer unit) and a blower 22 that provides the driving pneumatic force for carrier movement. A set of transfer units 20, 21 a blower 22 and one or more stations 16, 18 typically define a single zone (e.g., zones A, B and C). The by-pass transfer unit 21 is a point of connection to each zone, in the present embodiment. However this is not a requirement.

Within the system 10 itself, one or more devices are employable for ordering and routing carriers to their selected destinations. One type of device is a traffic control unit (TCU) 14 which is employable to receive, temporarily store and controllably release one or more carriers. Such functionality allows, for example, holding a carrier until a path through a subsequent potion of the system becomes available. In certain configurations, one or more TCUs 14 may be provided to operate as linear storage devices, e.g., on a first in first out (FIFO) basis. In other configurations, one or more TCUs 14 may be provided to operate as matrix style storage devices which store carriers in two-dimensional matrixes, wherein each carrier is separately storable, retrievable and releasable without movement of other carriers stored in the matrix.

Also included in the system 10 illustrated in FIG. 1 are multi-linear transfer units (MTUs) 12 which have functionality to direct carriers from one pneumatic tube to another and generally from a first zone to a second zone (e.g., inter-zone transfers). For example, a MTU 12 may receive a carrier released by a TCU 14 in a first tube exiting a first zone and direct the carrier into a second pneumatic tube entering into a second zone to complete a given transaction.

Figure 2:
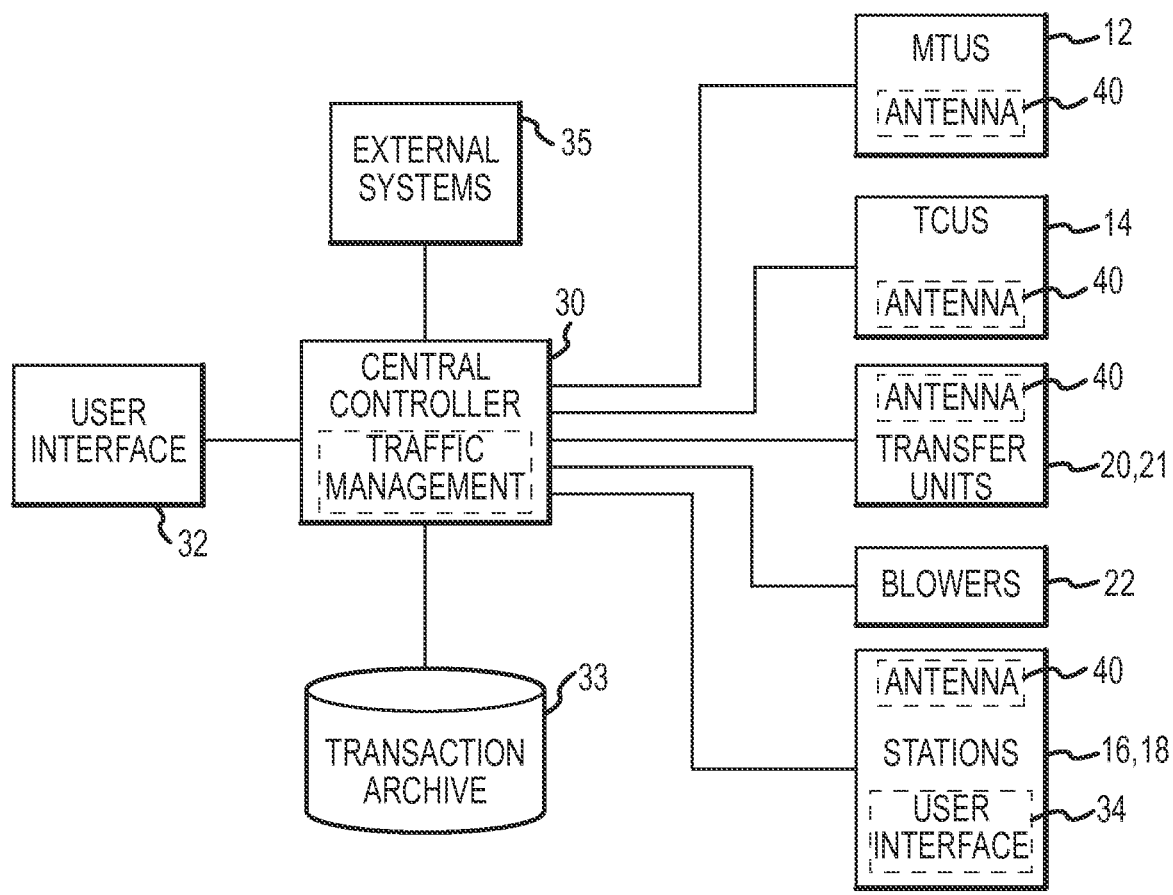
FIG. 2 illustrates a control system for use in controlling a pneumatic tube system.

All of the components described in FIG. 1 electronically connect to a central controller which controls their operation. Disclosed in FIG. 2 is an electrical system diagram for the pneumatic carrier system 10 described herein. Providing centralized control for the entire pneumatic carrier system 10 is a system central controller (SCC) 30. The SCC 30 may include a digital processor and memory. SCC 30 may be configured as one or more programmable digital computers. Connectable to the SCC 30 may be one or more user interfaces 32 through which a system user may monitor the operations of the system and/or manually enter one or more commands to control its operation. Typically, at least one user interface 32 is located at or within an area serviced by stations 16, 18. For example, in a medical facility application, one or more user stations 16, 18 and at least one user interface 32 may be provided within each emergency room, laboratory, nursing station, etc. In this regard, the user interface may be contained in the stations 16, 18, or be stand-alone units.

Each of the components described above in relation to FIG. 1 may include one or more electrical and/or electro-mechanical components which provide for the physical movement of a carrier within the system 10 and/or the obtainment/provision of information relating to the location of the carriers within the system 10. In this regard, the components shown in FIG. 2 are representations of the various electrical and electro-mechanical systems that may be employed by the pneumatic carrier system 10. Although in FIG. 2 they are represented single blocks, one skilled in the art will realize that the block for each type of device represents the electronics for a number of the same or similar type of components positioned throughout the system which provides for its operation. In various embodiments, each of the user stations 16, 18, MTUs 12 and TCUs 14 may incorporate antenna devices/readers 40 configured to energize and retrieve identification information from identification devices such as ID chips that may be incorporated into each of the carriers. Such a system is set forth in co-assigned U.S. Pat. No. 7,243,002, the contents of which are incorporated herein by reference.

Referring again to the electrical system diagram of FIG. 2, it may be seen that various transfer units 20, 21 and blowers 22 are also electrically connectable to the SCC 30. Through these connections, SCC 30 may send command signals to these devices so that they are actuated and operating at particular times and in particular sequences to affect the completion of the various carrier transactions. Other signals exchanged may include various monitoring signals that indicate the devices are operating as desired.

The SCC 30 is further connectable to a transaction archive 33, or database, which is configured to store transaction information for carriers moving within the system 10. The transaction information may include identification information for carriers moving through the system and destination information entered by a system user. Further, the transaction information may include sender identification, recipient identification, security information (e.g., PIN numbers) and/or location information obtained via tracking inputs received from antenna devices/readers 40 located at user stations 16, 18, TCUs 12 or other components along the travel path of a given carrier 100. The external systems 35 connected may depend on the purpose of the pneumatic carrier system 10. For example, the external systems 35 may include a lab information system, a pharmacy information system, a patient information system, a security information system and/or messaging systems (e.g., email, text, paging, or wireless system, etc.).

System Operation

Referring to zone A, intra-zone transfer between station 18x and stations 18y is described. Initially, a user inserts a carrier into station 18x and requests transfer to station 18y. The system controller operates the blower 22 of zone A to provide vacuum to station 18x. This requires aligning the internal tubing of the by-pass transfer unit 21 and the transfer unit 20 to the pneumatic tube 6 connecting station 18x to the transfer unit 20. Once aligned, the blower provides vacuum and the carrier is drawn into the pneumatic tube 6. The carrier passes through the transfer unit 20 and is received in the by-pass transfer unit, which holds the carrier during realignment. That is, the system controller aligns the internal tubing of the transfer unit 20 with the pneumatic tube 8 interconnected to station 18y. The blower 20 then provides pressure to the carrier expelling the carrier out of the by-pass transfer unit 21 through the transfer unit 20, into tube 8 and to station 18y.

Inter-zone transfer is now discussed in relation to movement of a carrier from station 18x in zone A to station 18z in zone C. Again, to provide vacuum to station 18x, the system controller aligns the internal tubing of the bypass transfer unit 21 and transfer unit 20 to provide a continuous pneumatic path between station 18x and the transfer unit 21. Accordingly, the vacuum may be applied to these aligned tubes to draw a carrier from station 18x into the bypass transfer unit 21. At this time, internal tubing of transfer unit 21 may be aligned with the output tube 9. Once aligned, blower 22 provides positive pressure behind the carrier, which ejects the carrier from the bypass transfer unit 21 and into tube 9. The carrier is received by TCU 14 where it awaits delivery into the inter-zone transfer unit MTU 12. The MTU 12 interconnects different zone of the pneumatic tube system.

The carrier exits the TCU 14 and is directed into the MTU 12A under gravity and/or positive pressure provided by the blower 22 of zone A. The transfer device of the MTU then aligns the received carrier with a desired output/exit tube 46. Either gravity and/or applied vacuum forces draw the carrier out of the MTU 12 and into the output/exit tube. In the present arrangement, the exit tube is an express tube that contains its own blower to provide vacuum to draw the carrier out of the first MTU 12A, into the output tube 46 and deliver the carrier to the second MTU 12B. The process is then repeated where the transfer device of the second MTU 12B receives the carrier and moves the carrier into position with a dedicated outlet tube leading to the bypass transfer unit 21C of zone C. The MTU releases the carrier into the output tube under gravity forces and/or vacuum forces applied by the blower 20C. Once the by-pass transfer unit 21C receives the carrier, it is realigned to provide the carrier to transfer unit 20C, which is aligned with desired station 18z. Accordingly, the blower 22 may be operated to move the carrier out of the bypass transfer 21, through the transfer unit 20 and to station 18z.

Figure 3:
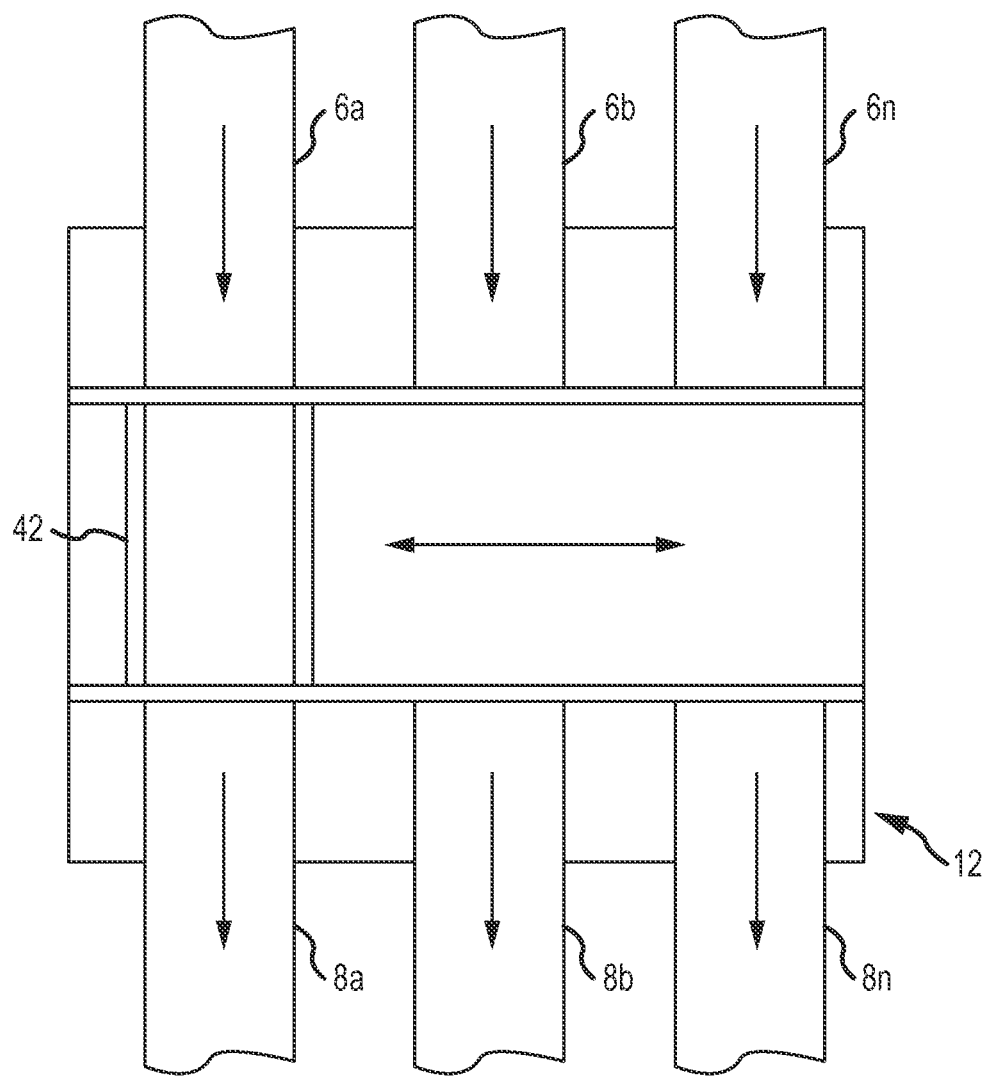
FIG. 3 illustrates one embodiment of a matrix-style zone transfer device.

FIG. 3 illustrates a break-away view of an exemplary MTU 12. As can be seen, the MTU includes a plurality of incoming/inlet tubes 6a-n. Generally, each of these incoming tubes is interconnected to either a different zone or an inter-zone transfer tube (e.g., dedicated tube) between MTUs or different sets of zones. Exiting the MTU 12 are a plurality of exit/outlet tubes 8a-n. Referring to FIGS. 1 and 3, it is noted that each zone (e.g., zone A) includes first and second dedicated tubes interconnected to the MTU 12. Particularly, the bypass transfer unit 21 includes an outlet tube leading to the MTU and an inlet tube leading from the MTU. In this regard, each bypass transfer 21 typically requires first and second interconnections (e.g., dedicated input and output lines) to the MTU. In operation, the MTU includes a carrier delivery device 42 (e.g., bucket 42), which is moveable along guides so as to position the bucket relative to one of the input tubes 6*a-n*. That is, the bucket 42 may be positioned beneath a particular tube to receive an incoming carrier delivered from a particular zone. Once the carrier is received within the bucket 42, the bucket may move to a position above an exit tube that leads to a desired destination zone.

In operation, a TCU 14 is often positioned above the MTU 12 in order to hold a carrier until the bucket 42 may be positioned beneath the tube extending between the TCU 14 and the MTU 12. That is, these components are typically disposed in a vertical configuration such that the TCU 14 may drop the carrier into the MTU under the force of gravity. Likewise, the tubes 8*a-n* exiting the MTU are also typically vertical such that the bucket may drop the carrier into a desired exit tube. However, in many instances, it is required that a blower provide positive pressure to move a carrier from the TCU 14 into the MTU 12 and/or a blower provide vacuum to draw a carrier out of the MTU. This can require that the blower from a delivering zone and/or receiving zone stand-by to process the transaction. Furthermore, due to the matrix style nature of the MTU 12, the blower (e.g., blower 22 of zone A), delivering a carrier to the MTU, typically cannot provide pressure to move the carrier out of the MTU 12, into an exit tube and/or to deliver the carrier through the exit tube. Rather, a receiving blower must supply vacuum pressure to the receiving tube 8 to either or both remove the carrier from the bucket and draw the carrier through the tube.

While providing an effective transfer unit between first and second zones, the MTU 12 suffers several drawbacks. First, due to the desirability of utilizing gravity to drop carriers into and/or out of the MTU 12, such MTUs are often formed in a vertical configuration. This requires considerable vertical space in order to locate an MTU system (e.g., 8-12 feet). Furthermore, the moveable bucket arrangement prevents direct pneumatic contact between a blower of a first delivering zone and a receiving zone. Accordingly, once the blower delivers the carrier to the MTU 12, that blower is ineffective to provide further downstream operation. Stated otherwise, an MTU or other matrix style transfer device prevents inter-zone communication of pressure or vacuum. Further, the utilization of the gravity drop system can result in carriers impacting the bottom of the bucket 42 of the MTU, which in some instances can cause a carrier to open. The current configuration also requires that each zone have first and second tubes (e.g. inlet and outlet tubes) interconnected to an MTU 12 requiring additional/complex piping. That is, typically two tubes extend between each zone and an MTU to provide effective inter-zone coupling. Further, a matrix style transfer device can limit the number of zones that can be added to a system. That is, once the number of zones equals the number of input lines to the matrix transfer device, the only way to add further zones is to add another matrix transfer device and interconnect the two matrix transfer devices. While effective, such interconnection again requires complex tubing runs and can result in delays in transaction processing as a carrier must pass through an additional matrix transfer device to effectuate certain transactions.

System Interchange Zone

Aspects of the present invention are based upon the realization that pneumatic tube system design and operation may be simplified by eliminating the MTUs to interconnect different zones of a system. More specifically, it has been recognized that an inter-zone transfer device that operates in a manner similar to first and second transfer units disposed in a back-to-back relationship may provide significant benefits to the system. These benefits include, without limitation, simplified piping structure, cross zone pneumatic connection, the elimination of gravity dependency, and simplified system expansion.

Figure 4A:
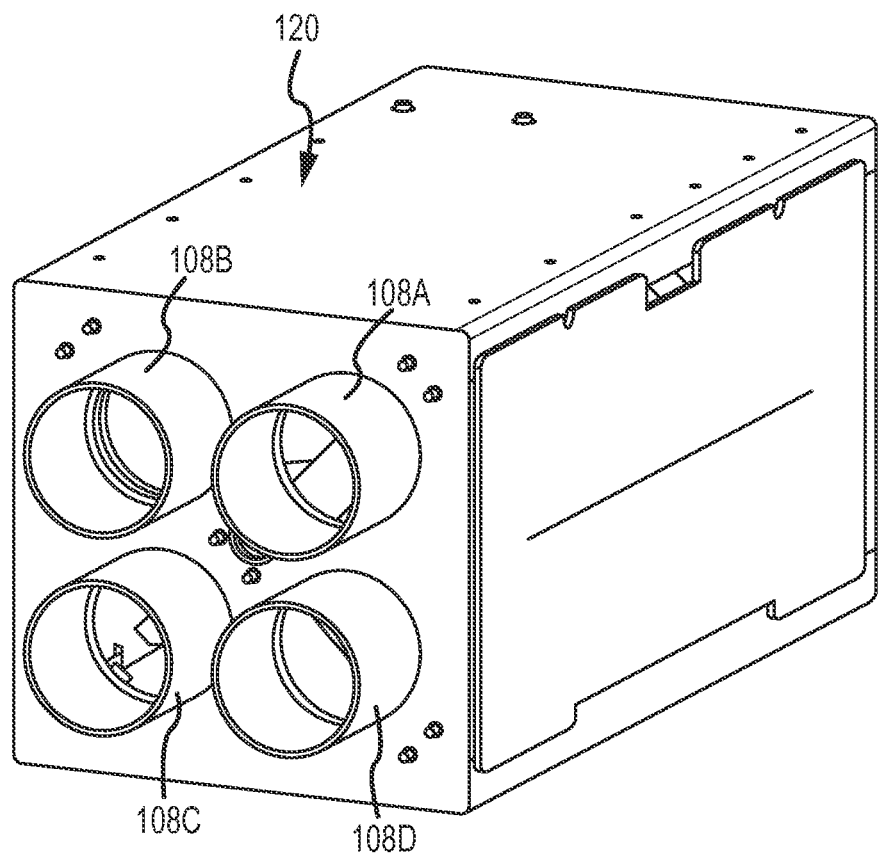
FIG. 4A illustrates a perspective view of a transfer unit that transfers a single tube to one of four interconnecting tubes.
Figure 4B:
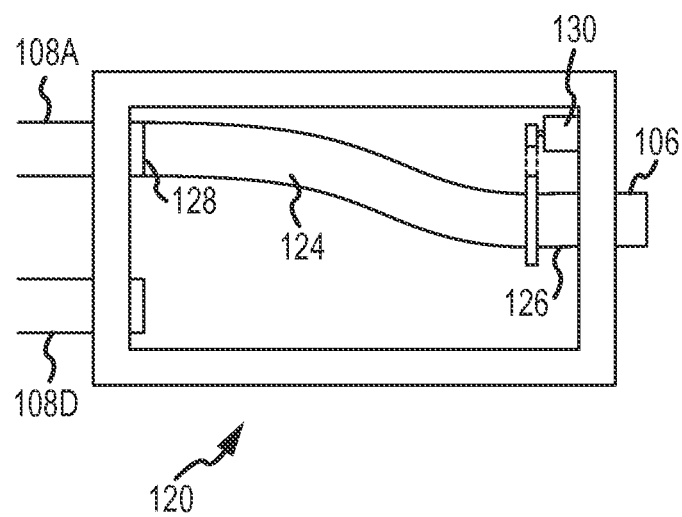
FIG. 4B illustrates a side view of the transfer unit of FIG. 4A.

FIGS. 4A and 4B illustrate a perspective and side view of a transfer unit 120. As shown, the transfer unit is a diverting unit that allows for pneumatically connecting any one of four tubes 108A-108D that enter into one end of the transfer unit with a single tube 106 that enters an opposite end of the transfer unit 120 (e.g., a 1×4 transfer unit). To accomplish such transfer/diversion, the transfer unit 120 includes a transfer tube 124. As shown, the transfer tube 124 is a bent or offset tube that may be selectively positioned between a single headend port connected to the single tube 106 and any one of four back end or transfer ports, each of which is connected to one of four tubes, which may be interconnected to different zones, stations etc. Once the transfer tube 124 is positioned adjacent to one of the transfer ports and a corresponding tube, the carrier may pass between the single tube and the selected tube. In this regard, it will be appreciated that the transfer tube 124 is typically a curved tube having a head end 126 rotatively coupled to the head end of the transfer unit and the single head end port. However, it will be appreciated that in other embodiments, a head end of the transfer unit may also be positionable between two or more head end ports. The offset transfer end 128 may be rotated to an adjacent position with any one of the four transfer ports and a corresponding one of the tubes. While illustrated as including four transfer ports, it will be appreciated that other embodiments may utilize other arrangements. Generally, a motor 130 is interconnected proximate to the head end of the transfer tube. The motor 130 is operative to rotate the tube utilizing, for instance, sprockets, gears, etc.

Figure 5A:
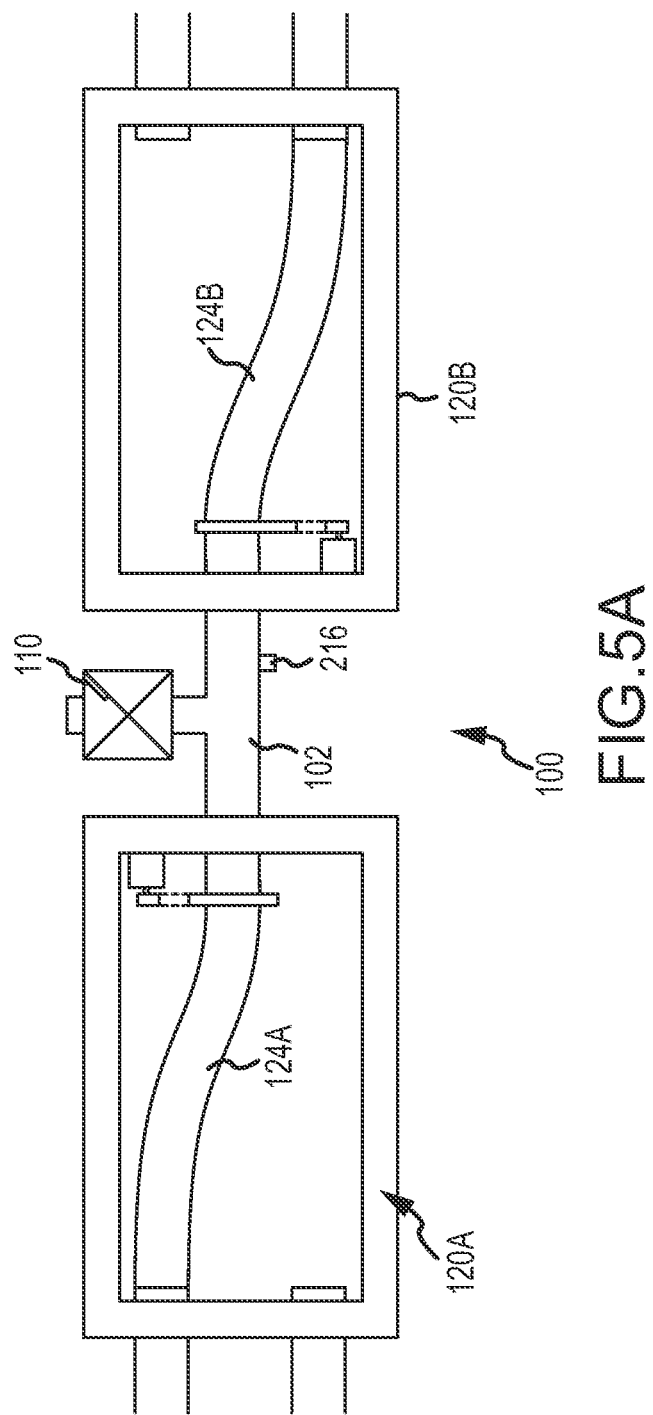
FIG. 5A illustrates one embodiment of an inter-zone transfer unit.

FIG. 5A illustrates an inter-zone transfer unit 100 utilizing a back-to-back transfer unit design. As shown, first and second transfer units 120A, 120B are disposed in a facing orientation such that the head end ports are interconnected by single interconnecting tube 102. Transfer tubes 124A, 124B thus create a continuous pneumatic tube extending between the multiple inlets of each of the transfer units 120A, 120B. Furthermore, by adjusting the position of each of these transfer tubes 124A, 124B, any of four (or more) tubes interconnected to the first transfer unit 120A may be directly and pneumatically interconnected to any of four tubes interconnected to the second transfer unit 20B. Furthermore, due to the continuous pneumatic path (e.g., defined by the two transfer tubes 124A, 124B and connecting tube 102) then extending between these interconnected first and second tubes, a carrier may pass through this connection (e.g., potentially an inter-zone connection) without stopping utilizing airflow from a blower associated with the first tube or utilizing airflow from a blower associated with the second tube.

It will be appreciated that in most pneumatic tube systems blowers operate continuously. That is, rather than starting a blower each time a transaction is initiated, the blower runs continuously and air pressure is vented to atmosphere if not needed. Due to the continuous pneumatic path created by the inter-zone transfer device and the continuous operation of the blowers, a vent is required to either vent positive pressure to atmosphere or provide ambient air to a blower providing vacuum until the system components are properly aligned and a carrier is released for transfer. Accordingly, the present embodiment utilizes a pressure/vacuum relive valve 110 fluidly connected to the interconnecting tube. This valve allows for venting the interconnecting tube to atmosphere to either exhaust pressure or provide ambient air. This valve allows for pneumatically isolating a first and second zone until pressure from one zone is desired in the other zone.

The inter-zone transfer unit 100 may also include a carrier passage sensor 116 connected to the connecting tube 102. Such a sensor may be any element that allows a controller of the transfer unit of the pneumatic system to identify when a carrier passes through the connecting tube 102. Typically, the sensor is located proximate to the valve such that the valve may be selectively opened or closed after a carrier passes beyond the valve.

FIG. 5B illustrates another embodiment of the inter-zone transfer unit 200. As shown, rather than utilizing first and second transfer units having head end ports connected by a single connecting tube, this embodiment is an integrated unit. In this regard, first and second ends of the unit each include multiple transfer ports that are connectable to multiple tubes. Again, the unit utilizes first and second transfer tubes 224a, 224b that each have a head end rotatably coupled to a pneumatic connector 202 extending between the transfer tubes. The second ends of each transfer tube are again offset to selectively connect to the transfer ports. A carrier passage sensor 216 may monitor carrier passage through the pneumatic connector. Finally, a pressure relief valve 220 is connected to the pneumatic coupler.

Figure 6:
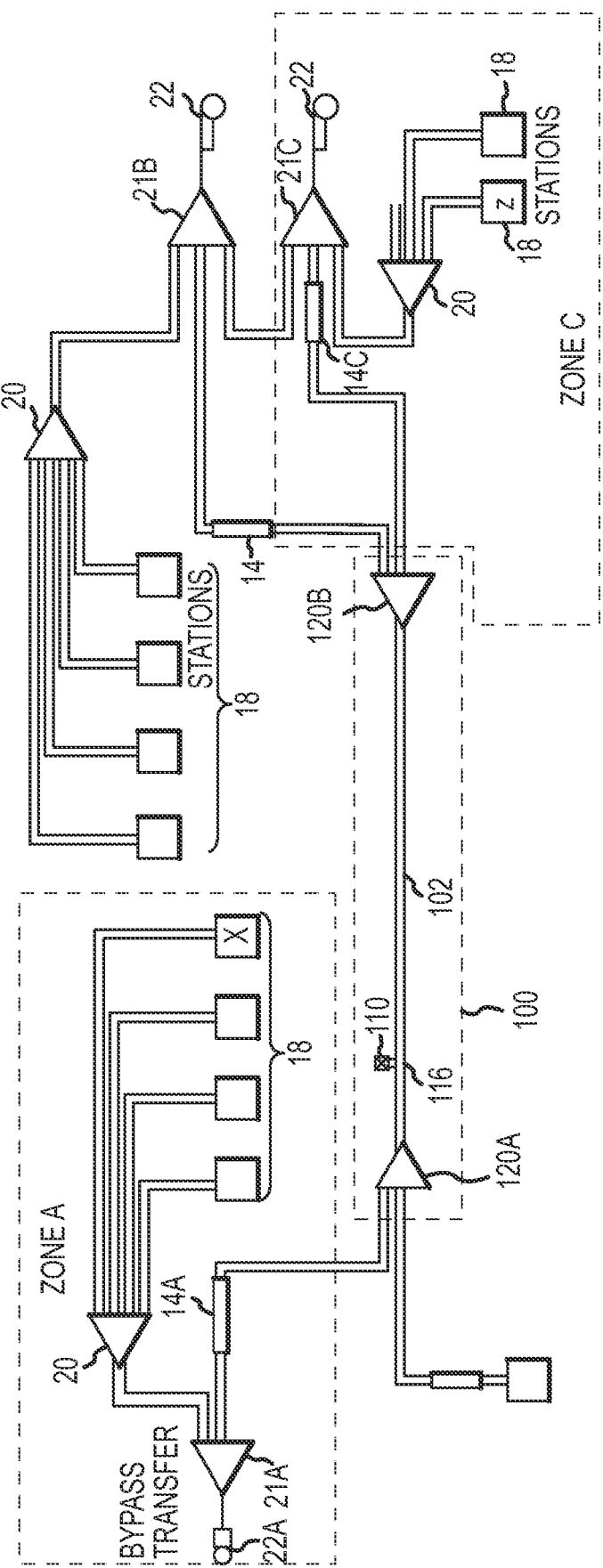
FIG. 6 illustrates the pneumatic tube system of FIG. 1 modified to incorporate an inter-zone transfer unit in accordance with aspects of the present invention.

FIG. 6 illustrates a pneumatic system 10 of FIG. 1 as modified to utilize the interzone transfer unit disclosed herein. As illustrated, the MTUs 12A, 12B of FIG. 1 are removed and replaced by an interzone transfer unit system 100. In this arrangement, the interconnecting tube 102 may be of significant length. However, rather than requiring use of first and second unidirectional tubes extending between the first and second MTUs, a single interconnecting tube 102 may interconnect the first and second transfer units of the intra-zone transfer unit system. In this arrangement transfer of a carrier from zone A to zone B is greatly simplified. For instance, once a carrier originating in zone A reaches the bypass transfer unit 21A, it may be delivered to TCU 14A to await transfer to zone C or potentially may pass directly through the TCU for deliver to Zone C. At this time, transfer tubes 24A, 24B of the inter-zone transfer unit 100 may be aligned to interconnect zones A and C. With the carrier staged at the by-pass transfer unit 21A or TCU 14A, either of the blowers 22A or 22C may be utilized to deliver the carrier from zone A to zone C. For instance, blower 22A may be aligned to provide pressure to TCU 14A to push the carrier through the tubing between for example TCU 14A and TCU 14C. Alternatively, blower 22C may provide vacuum to the carrier 14A staged in TCU 14A and thereby draw the carrier through the tubing until it reaches TCU 14C.

As noted above, the interconnecting tube 102 includes the pressure vacuum relief valve 110 to facilitate use of blowers from either of two connected zones. Specifically, the relief valve 110 permits aligning the transfer tubes 124A, 124B of the inter-zone transfer unit 100 while one of the blowers interconnected by the transfer units is providing vacuum or pressure. Referring to the example above, in relation to FIG. 6 where a carrier is parked in TCU 14A, the relief value 110 may be open while blower 22C provides vacuum. This prevents the blower from starving for air and isolates the zones (A and C) until a desired time. Once all of the components are aligned, the value 110 may be closed. At this time, vacuum is applied through the connected tubing and to TCU 14A, which may then release the carrier allowing it direct transfer through the tubing to zone C. As will be appreciated, the ability to utilize either blower provides additional flexibility for the system. That is, the first available blower may be utilized to deliver the carrier between zones. Furthermore, if blower 22C were utilized to draw the carrier, blower 22A is then free to continue processing transactions in zone A. The carrier passage sensor may also monitor for passage of a carrier(s) associated with alignment of the transfer tubes 124A, 124B. Referring to an example of where blower 22C provides vacuum to draw a carrier from TCU 14A, it will be appreciated that once the carrier passes by the carrier sensor, the relief valve (which is proximate to the sensor) may be re-opened to provide air. Further, the transfer tube 124A of the first diverter 120A may be aligned to process another transaction prior to the carrier being delivered to zone C. Accordingly, this ability to provide interzone pressure may allow for increasing throughput of the overall system.

A further benefit of the system is the potential reduction of the number of tubes utilized to interconnect various points of the system. As noted above, the various transfer units and bypass transfer units may have varying different numbers of input/output tubes. Nonetheless, the ability to utilize bi-directional tubes to interconnect these units to different zones typically frees up one or more ports. That is, as dedicated input and return lines are not required for connection to an inter-zone connecting device (e.g., MTU) each by-pass device transfer unit (or transfer unit) has another port for interconnection to additional stations and/or for direct connection between zones. For instance, referring to zone C of FIG. 6, the bypass transfer 21C of zone C may directly connect with the bypass transfer unit 21B of zone B or, alternately, to the transfer unit 20B (not shown). Accordingly, adjacent zones may be directly interconnected and thereby further improve the overall throughput of the system. Use of single tube interconnection between the inter-zone transfer unit and each zone may require that temporary storage devices such as TCUs permit bi-directional travel. That is, such temporary storage devices must allow for temporarily holding a carrier moving in either of two directions. ON such temporary storage device that permits such bi-directional travel is set forth in co-assigned U.S. patent Ser. No. 12/574,909 entitled: "Variable Diameter Pneumatic Tube Brake", the entire contents of which is incorporated herein.

Utilization of an inter-zone transfer unit 100, 200 may allow for removal of MTUs from a system and thereby eliminate gravity dependency found in most previous systems. That is, by utilizing an inter-zone transfer unit 100, 200 carriers are under active pressure or vacuum during the transfer process. This eliminates the need for a vertical orientation of the inter-zone connection. Furthermore, potential impact shocks and/or opening of the carriers caused by dropping carriers under gravity into a zone transfer device are eliminated. Accordingly, carriers are less likely to hang up within the system. Use of single tube interconnectors may require that temporary storage devices such as the TCUs permit bidirectional travel therethrough. Once such temporary storage device that permits such bidirectional travel is set forth in co-assigned U.S. patent application Ser. No. 12/574,909, entitled, "Variable Diameter Pneumatic Tube Brake," the entire contents of which are incorporated herein.

In a further arrangement, the system provides a further enhanced benefit. Specifically, the system permits transfer of multiple carriers in a single transfer operation. In such an arrangement, multiple carriers may be aligned in a TCU or other staging location. For instance, TCU 14A may hold multiple (e.g., two or more) carriers end-to-end (i.e., as a carrier train). Once the valve 110 is closed and the TCU releases the carriers, all these carriers may travel as a group from zone A to zone C. This allows moving multiple carriers zone to zone in a single transaction rather than having to handle each carrier individually. It will be appreciated that such an arrangement has particular value in systems that are spread over large geographic distances. For instances, hospitals often utilize a single lab, which may be located at a considerable distance from portions of the hospital. In such an arrangement, it is not uncommon for the transfer tube between one or more portions of the hospital and the lab to extend over significant distances. Accordingly, the present system allows for running a single tube between a remote portion of a hospital and the lab (e.g., a connecting tube 102) and sending multiple carriers in a single transaction rather than sending individual carriers sequentially and or utilizing first and second dedicated one-way tubes. It will be appreciated that such a system may provide equal throughput or near equal throughput as a system that utilizes dedicated one-way tubes while significantly reducing the capital costs required to establish pneumatic communication between distant locations.

Figure 7A:
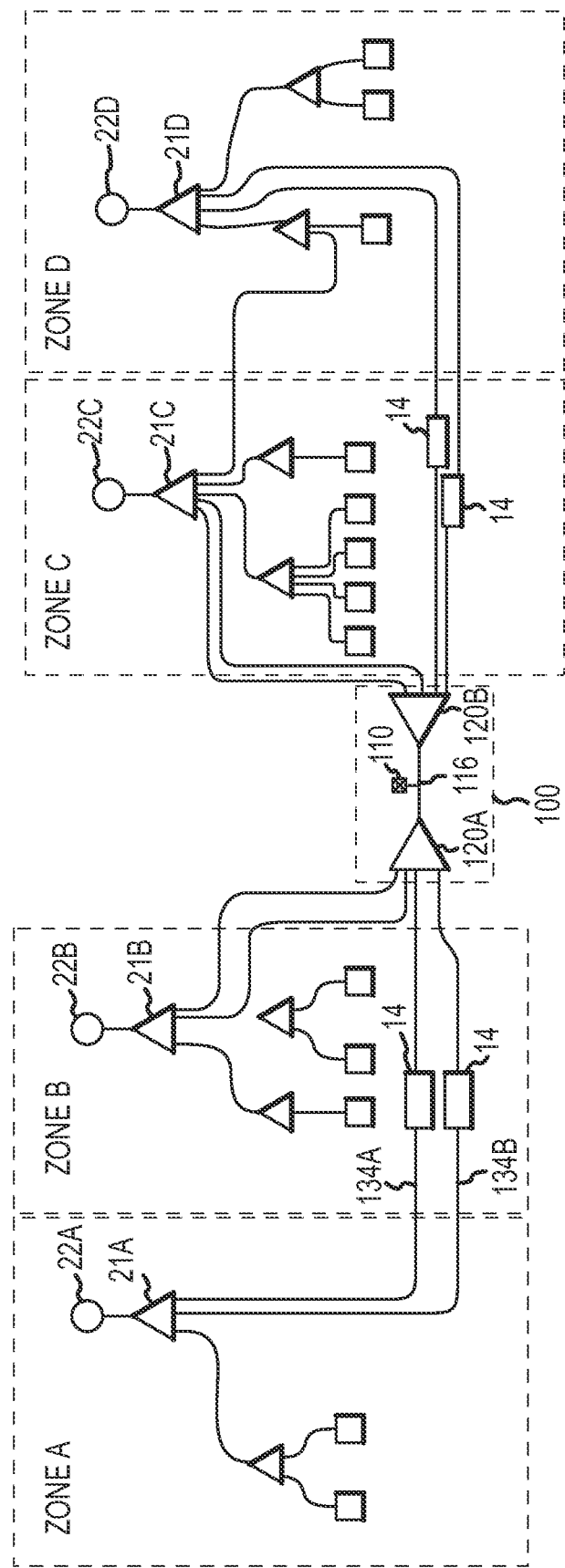
FIG. 7A illustrates another pneumatic tube system interconnected utilizing an inter-zone transfer device.
Figure 7B:
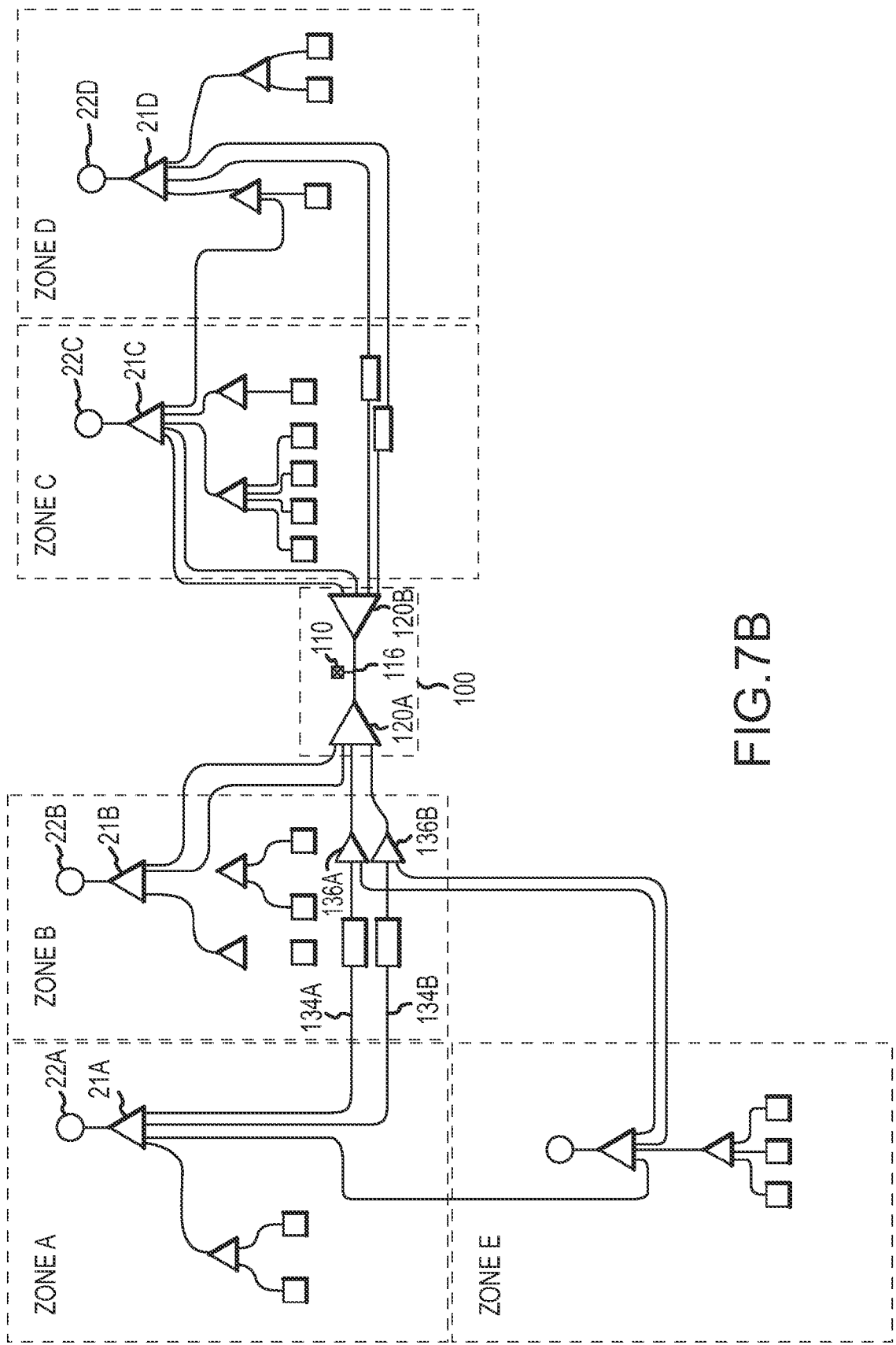
FIG. 7B illustrates adding zones to the pneumatic system of FIG. 7A facilitated by use of the inter-zone transfer device.

FIGS. 7A and 7B illustrate a further benefit of interconnecting multiple zones utilizing an inter-zone transfer unit 100. As shown, in the initial system configuration illustrated in FIG. 7A, four zones A-D are interconnected by an inter-zone transfer unit 100. In this particular embodiment, each of the four zones A-D is initially connected to the transfer units 120A, 120B of the inter-zone transfer unit 100 via first and second dedicated/unidirectional pneumatic tubes. For instance, zone A interconnects to transfer unit 120A via first and second dedicated tubes 134A, 134B. Referring to FIG. 7B, the addition of an additional zone E is illustrated. As shown, the additional zone E may be added to the system by simply adding 1×2 diverters 136A, 136B into the unidirectional tubes 134A, 134B interconnecting zone A to the inter-zone transfer device. In this regard, zone E may interconnect to the pneumatic system without requiring dedicated interconnection at a location of a matrix-style zone transfer device. In this regard, the 1×2 diverters 136A, 136B may be selectively controlled to interconnect the new zone E to the inter-zone transfer device as needed. In this regard, it will be appreciated that zone E may tap into one or more pneumatic lines interconnecting an existing zone to an inter-zone transfer unit at any location where such interconnection is convenient. That is, if zone A and zone E are remotely located from the remainder of the zones, rather than running one or more new dedicated lines between zone E and matrix-style transfer device, a short tubing run between zone E and zone A may be permitted. Of course, zone A and zone E may be directly interconnected to eliminate the necessity of interconnecting these zones via the inter-zone transfer unit. Furthermore, it will be appreciated that interconnection of a new zone may only require the addition of a single 1×2 diverter in systems that utilize bidirectional single tube interconnections.

In a further arrangement illustrated in FIG. 7A, two of the zones B and C are interconnected via an inter-zone transfer unit 100 free of any temporary storage devices such as TCUs. In this arrangement, these each zone are illustrated as using dual connections to the transfer units 120A, 120B of the inter-zone transfer device 100 however single tube connection is possible as well. In such an arrangement, transfer is direct from the bypass transfer devices 21 of a delivering zone to the receiving zone. In such an arrangement, the by-pass transfer device of at least the delivering zone bypass transfer unit may be aligned in conjunction to aligning the transfer units 120A, 120B. Accordingly, the blower of the delivering zone or receiving zone may be utilized to effectuate transfer of the first bypass transfer unit to the second zone or even into the second bypass transfer unit. Alternatively, the first zone may deliver the carrier (utilizing positive pressure) until the carrier is disposed past the relief valve in the inter-zone transfer unit 100 as determined by the sensor 116. At such time, the first zone may cease providing pressure, and the receiving zone may apply vacuum to the carrier (e.g., immediately or at a subsequent time), which may be at some location beyond the relief valve 110. Accordingly, the relief valve 110 may be open to provide ambient air for the vacuum being applied by the receiving zone.

Accordingly, the presented systems allow for greatly simplifying the addition of a single or multiple zones to existing pneumatic tube systems. Furthermore, incorporation of an inter-zone transfer device may allow for reducing the number for use of temporary holding devices between sending and receiving zones. Accordingly, the capital costs of the pneumatic system may be further reduced.

A further benefit of utilizing the inter-zone transfer devices disclosed above is a provision of redundancy to the pneumatic tube system. Specifically, the ability to utilize airflow (pressure or vacuum) for inter-zone applications may allow for maintaining a normal or near normal operations in various system zones even if an air source in one zone becomes inoperative.

Figure 8:
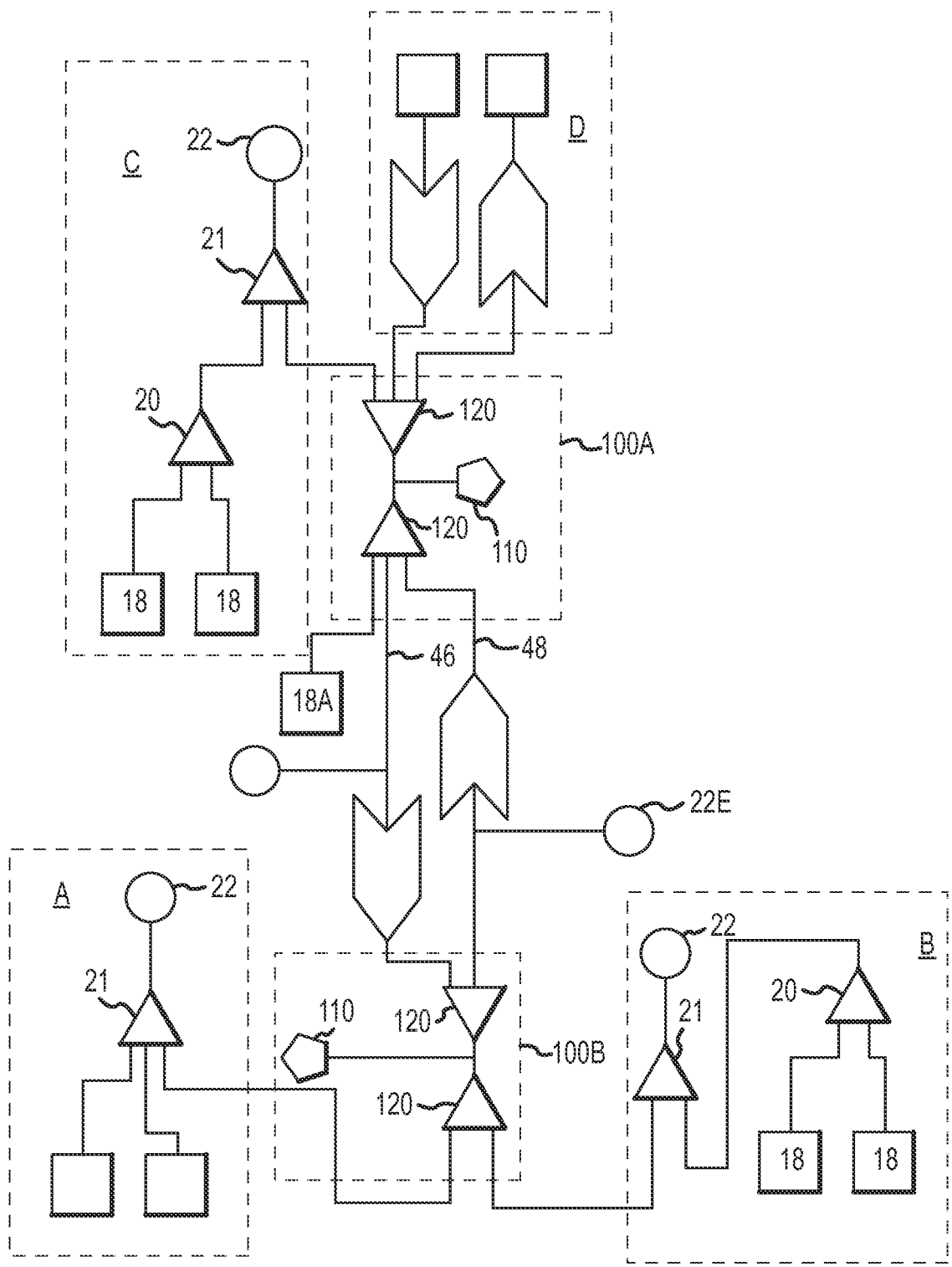
FIG. 8 illustrates a further pneumatic tube system that utilizes an inter-zone transfer device to provide redundancy to the system.

Referring to FIG. 8, another embodiment of a pneumatic tube system is illustrated. As shown, the system utilizes first and second inter-zone transfer devices 100a, 100b and is interconnected by dedicated unidirectional express tubes 46, 48. Further, each of the inter-zone transfer devices 100a, 100b is interconnected to one or more pneumatic zones A, B, C and D. As illustrated, the express tubes connecting the first and second inter-zone transfer devices 100A, 100B each utilize an independent air source or blower 22. That is, each of these lines has an integrated blower to provide continuous airflow through the tube. If one of these blowers were to become inoperative, the express tube between these systems would likewise be inoperable. However, the ability of the inter-zone transfer devices to make a direct pneumatic connections between zones may allow for operating the system even in the absence one or more blowers. For instance, if blower 22E of express line 48 were to become inoperative (e.g., via failure, maintenance, etc.) the inter-zone transfer device 100A may connect blower 22A or 22B to the express tube 48 to provide operating pressure for transferring carriers there through. Additionally and/or alternatively, inter-zone transfer device 100B could pneumatically connect blower 22C of zone C to the express tube to provide vacuum through this line. Accordingly, the ability to make such direct pneumatic connections between zones allows for utilizing air pressure or vacuum originating in one zone to maintain operations and/or complete operations in other zones.

The foregoing description of the presented inventions has been presented for purposes of illustration and description. Furthermore, the description is not intended to limit the inventions to the forms disclosed herein. Consequently, variations and modifications commensurate with the above teachings, and skill and knowledge of the relevant art, are within the scope of the presented inventions. The embodiments described hereinabove are further intended to explain best modes known of practicing the inventions and to enable others skilled in the art to utilize the inventions in such or other embodiments and with various modifications required by the particular application(s) or use(s) of the presented inventions. It is intended that the appended claims be construed to include alternative embodiments to the extent permitted by the prior art.

What is claimed:

1. A pneumatic transfer device for transferring a pneumatic carrier between a first pneumatic system portion including a first plurality of pneumatic tubes and a second pneumatic system portion including a second plurality of pneumatic tubes, comprising:
- a first diverter having a first head end with a first head end port, a first transfer end with a first plurality of ports connected to said first plurality of pneumatic tubes and a first transfer tube for selectively pneumatically connecting one of said first plurality of ports to said first head end port;
- a second diverter having a second head end with a second head end port, a second transfer end with second plurality of ports connected to said second plurality of pneumatic tubes and a second transfer tube for selectively pneumatically connecting one of said second plurality of ports to said second head end port;
- a connecting tube pneumatically interconnecting said first and second head end ports for direct transfer of a pneumatic carrier there between; and
- a valve in pneumatic communication with the connecting tube, said valve being selectively operative to vent said connecting tube to atmosphere.

2. The device of claim 1, further comprising:
a controller for generating control signals to align said first transfer tube with one of said first plurality of ports and align said second transfer tube with one of said second plurality of ports, wherein said first and second transfer tubes, said first and second head end ports and said connecting tube form a continuous pneumatic transfer path between a selected first tube of said first plurality of tubes and a selected second tube of said second plurality of tubes.

3. The device of claim 2, wherein an air source pneumatically connected to one of said selected first tube and said selected second tube is operative to provide air pressure or vacuum through said continuous pneumatic transfer path.

4. The device of claim 3, wherein said valve is operative to selectively vent air pressure originating from said air source or provide atmospheric air to said air source, wherein opening said valve to atmosphere prevents pneumatic communication between said selected first tube and said selected second tube.

5. The device of claim 4, wherein at least one of said selected first tube and said selected second tube further comprises:
an in-line carrier engagement device for selectively engaging a carrier.

6. The device of claim 1, wherein at least one of said first plurality of ports and said second plurality of ports includes at least four ports.

7. The device of claim 1, wherein, at least one of said first and second diverters further comprises:
at least a second head end port, wherein said transfer tube is operative to selectively pneumatically connect one of said plurality of ports to a selected one of said first and second head end ports.

8. The device of claim 1, further comprising:
a carrier sensor connected to said connecting tube, wherein said sensor generates a signal indicating passage of a carrier through said connecting tube.

9. The device of claim 1, wherein a controller operates said valve in response to said signal from said carrier sensor.

10. A pneumatic tube system for conveying a pneumatic carrier, comprising:
- a first system zone having a first air source interconnected to a first plurality of user stations;
- a second system zone having a second air source interconnected to a second plurality of user stations;
- a transfer device interconnecting said first and second zones, comprising:
  - a first diverter having a first plurality of ports selectively connected to a single connecting tube, wherein a first tube pneumatically connected to said first system zone is connected to one of said first plurality of ports;
  - a second diverter having a second plurality of ports selectively connectable to said single connecting tube, wherein a second tube pneumatically connected to said second system zone is connected to one of said second plurality of ports; and
  - a valve in pneumatic communication with the single connecting tube, said valve being selectively operative to vent said pneumatic coupling to atmosphere.

11. The system of claim 10, wherein a first transfer tube in said first diverter is operative to pneumatically connect said first tube to said connecting tube and a second transfer tube in said second diverter is operative to connect said second tube to said connecting tube, wherein said first and second tubes are pneumatically connected.

12. The system of claim 11, wherein the air source in one of said first and second zones is operative to supply pressure or vacuum the other of said first and second zones.

13. The system of claim 10, wherein said connecting tube directly connects said first diverter to said second diverter.

* * * * *